United States Patent
Yu et al.

(10) Patent No.: US 11,159,080 B2
(45) Date of Patent: Oct. 26, 2021

(54) ELECTROMAGNETIC DRIVING MODULE

(71) Applicant: TDK TAIWAN CORP., Taoyuan (TW)

(72) Inventors: Cheng-Kai Yu, Taoyuan (TW);
Liang-Ting Ho, Taoyuan (TW);
Shu-Shan Chen, Taoyuan (TW);
Chao-Chang Hu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 644 days.

(21) Appl. No.: 16/049,277

(22) Filed: Jul. 30, 2018

(65) Prior Publication Data
US 2019/0115818 A1    Apr. 18, 2019

(30) Foreign Application Priority Data
Oct. 18, 2017  (CN) .......................... 201710970671.4

(51) Int. Cl.
| *H02K 41/035* | (2006.01) |
| *H02K 11/22* | (2016.01) |
| *H02K 11/215* | (2016.01) |
| *G03B 5/04* | (2021.01) |
| *G03B 13/36* | (2021.01) |
| *H02K 11/01* | (2016.01) |

(52) U.S. Cl.
CPC .......... *H02K 41/0356* (2013.01); *G03B 5/04* (2013.01); *G03B 13/36* (2013.01); *H02K 11/0141* (2020.08); *H02K 11/022* (2013.01); *H02K 11/215* (2016.01); *G03B 2205/0015* (2013.01); *G03B 2205/0069* (2013.01)

(58) Field of Classification Search
CPC ................................................. H02K 41/0356
See application file for complete search history.

(56) References Cited

U.S. PATENT DOCUMENTS

2013/0314192 A1* 11/2013 Fontana, Jr. ........ H01F 17/0013
  336/200
2014/0078615 A1* 3/2014 Park ..................... H02K 5/1677
  360/86

(Continued)

FOREIGN PATENT DOCUMENTS

| CN | 102879973 A | 1/2013 |
| CN | 207301453 U | 5/2015 |
| TW | I457693 B | 10/2014 |

OTHER PUBLICATIONS

Office Action of corresponding CN Application No. 201710970671.4, dated Jul. 30, 2021, 6 pages.

*Primary Examiner* — Clayton E. LaBalle
*Assistant Examiner* — Dennis Hancock
(74) *Attorney, Agent, or Firm* — Muncy, Geissler, Olds & Lowe, P.C.

(57) ABSTRACT

An electromagnetic driving module is provided, including a first member, a second member movably connected to the first member, an electromagnetic driving assembly, and a film. The electromagnetic driving assembly includes a magnet and a coil respectively disposed on the first and second members, so as to move the second member relative to the first member. The film is disposed on a side of the magnet to reduce magnetic interference between the magnet and a magnetic element, wherein the magnetic permeability of the film is higher than the magnetic permeability of the first member.

12 Claims, 8 Drawing Sheets

(56) References Cited

U.S. PATENT DOCUMENTS

2015/0048713 A1* 2/2015 Caamano ............... H02K 1/185
                                                    310/216.063
2017/0006198 A1* 1/2017 Nishimura ......... H04N 5/22521
2017/0038601 A1* 2/2017 Fan .................... H02K 41/0356
2019/0068042 A1* 2/2019 Kimura .................... G03B 5/00

* cited by examiner

ELECTROMAGNETIC DRIVING MODULE

CROSS REFERENCE TO RELATED APPLICATIONS

The present application claims priority of China Patent Application No. 201710970671.4, filed on Oct. 18, 2017, the entirety of which is incorporated by reference herein.

BACKGROUND OF THE INVENTION

Field of the Invention

The invention relates to a driving module, and more particularly to an electromagnetic driving module that can move a lens using electromagnetic force.

Description of the Related Art

Conventional photo cameras, video cameras, and mobile phones usually comprise an optical system for capturing images. The optical system may vibrate due to external impact and cause deviation of the optical path, causing the images captured by the optical system to be blurry. Taiwan patent No. 1457693 discloses a conventional optical image stabilization device. When the autofocus function is executed, a current is applied to the coil, and electromagnetic induction occurs between the coil and the magnet, so that the holder moves with respect to the base along the optical axis of the optical system. Two displacement sensors are disposed in the device to detect the position of the optical axis along the X and Y directions. When the optical axis deviates from the norm, electromagnetic induction can occur between the coils and the magnets, corresponding to the X and Y axes, so as to correct the position of the optical axis. However, owing to the miniaturization of the coils, the magnets, and the displacement sensors, magnetic interference may easily occur between the magnets and other magnetic elements and affect the performance of the optical mechanism.

BRIEF SUMMARY OF THE INVENTION

In view of the aforementioned problems, an object of the invention is to provide an electromagnetic driving module that includes a first member, a second member movably connected to the first member, an electromagnetic driving assembly, and a film. The electromagnetic driving assembly includes a magnet and a coil respectively disposed on the first and second members, so as to move the second member relative to the first member. The film is disposed on a side of the magnet to reduce the magnetic interference between the magnet and a magnetic element, wherein the magnetic permeability of the film is higher than the magnetic permeability of the first member.

An embodiment of the invention further provides an electromagnetic driving module, including a first member, a second member movably connected to the first member, an electromagnetic driving assembly, and a film. The electromagnetic driving assembly includes a magnet and a coil respectively disposed on the first member and the second member to move the second member relative to the first member. The film is disposed on the magnet and located between the magnet and a magnetic element, to reduce the magnetic interference between the magnet and the magnetic element.

An embodiment of the invention further provides an electromagnetic driving module, including a first member, a second member movably connected to the first member, an electromagnetic driving assembly, a film, and a housing. The electromagnetic driving assembly includes a magnet and a coil respectively disposed on the first member and the second member to move the second member relative to the first member. The first member, the second member, and the electromagnetic driving assembly are disposed in the housing. The film is formed on the housing to reduce magnetic interference between the magnet and a magnetic element outside the electromagnetic driving module, wherein the magnetic permeability of the film is different from the magnetic permeability of the housing.

In order to illustrate the purposes, features, and advantages of the invention, the preferred embodiments and drawings of the invention are shown in detail as follows.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The making and using of the embodiments of an electromagnetic driving system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
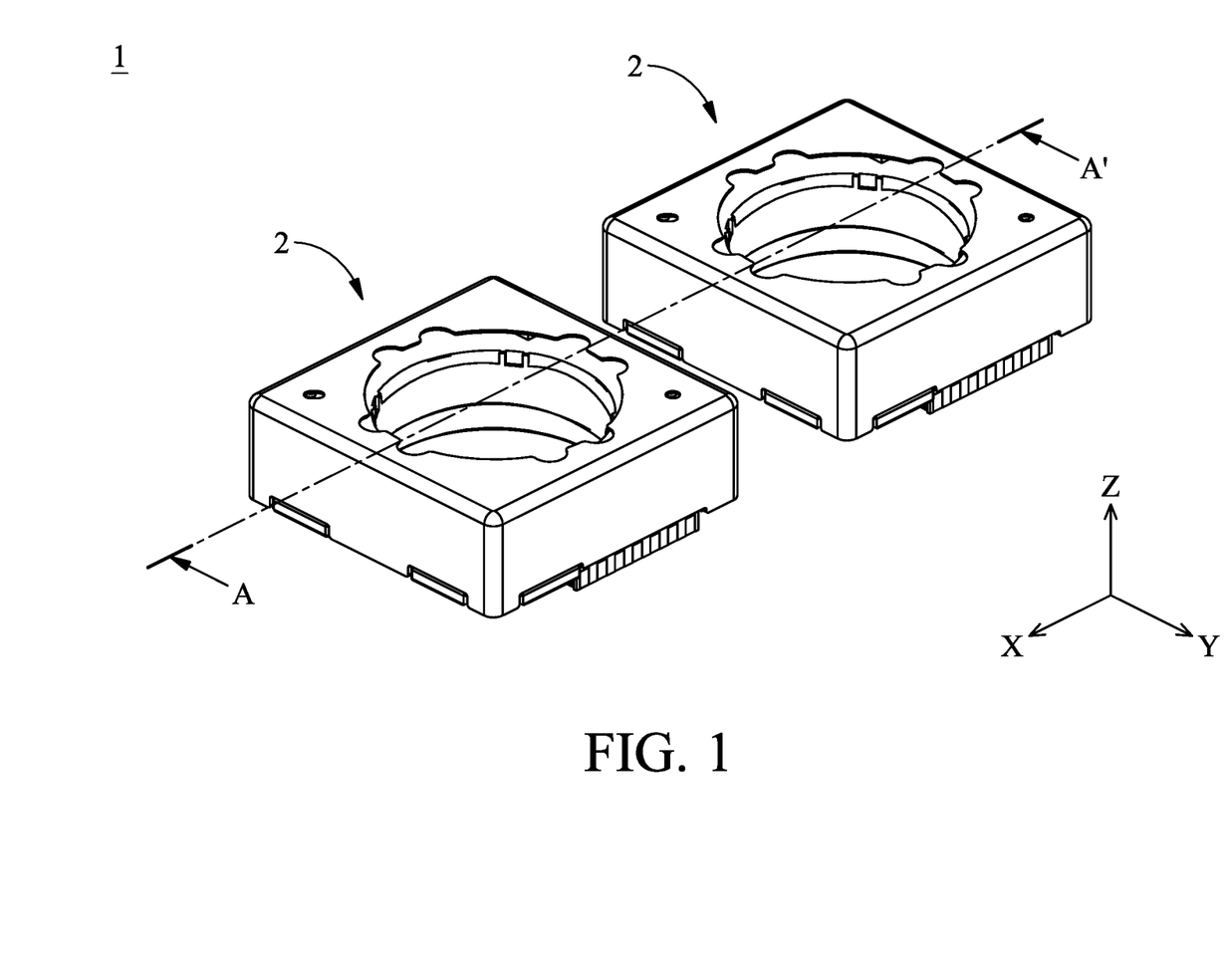
FIG. 1 is a schematic view of an electromagnetic driving system, in accordance with an embodiment of the invention.
Figure 2:
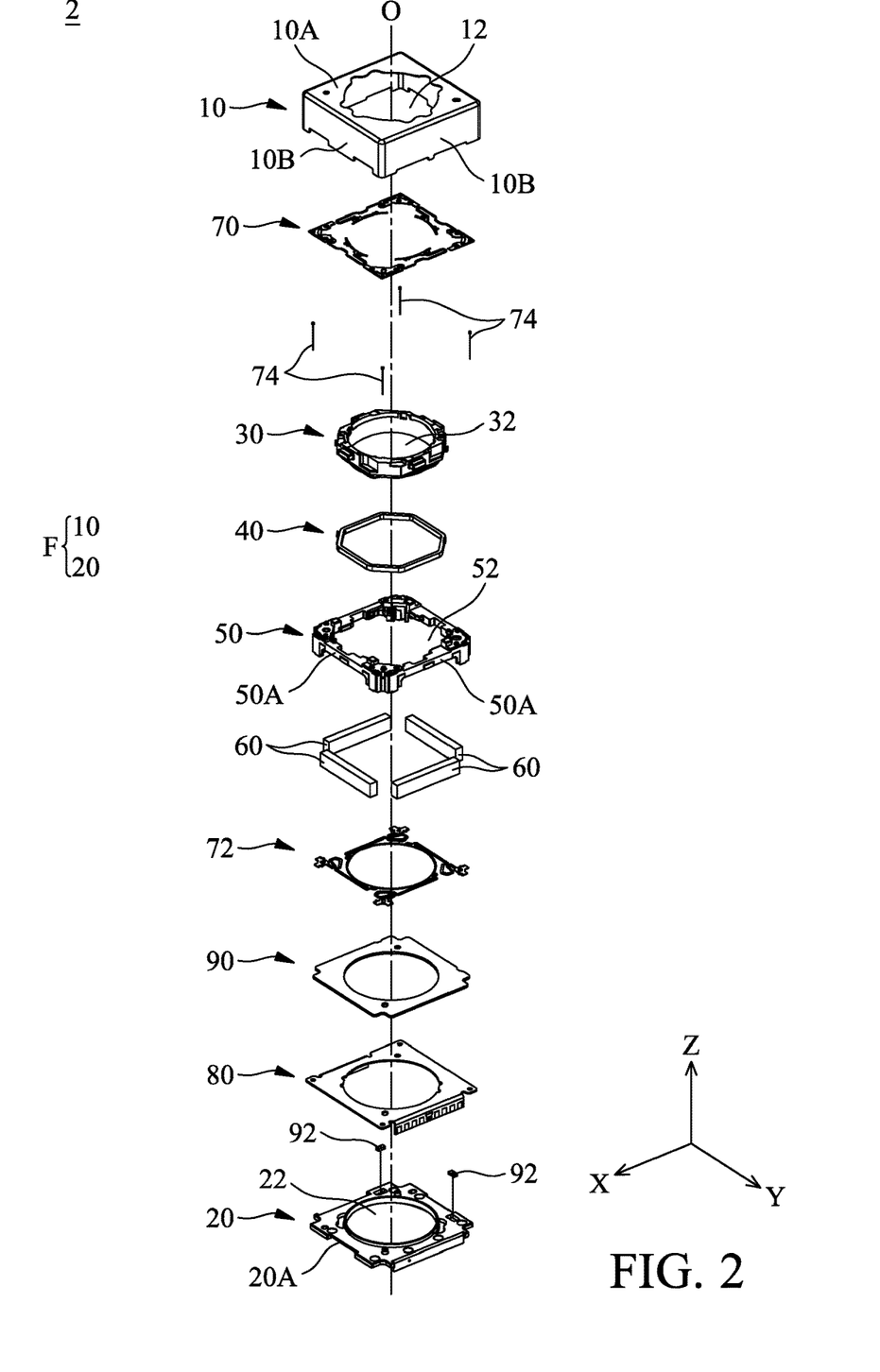
FIG. 2 is an exploded view of an electromagnetic driving module 2 in FIG. 1.
Figure 3:
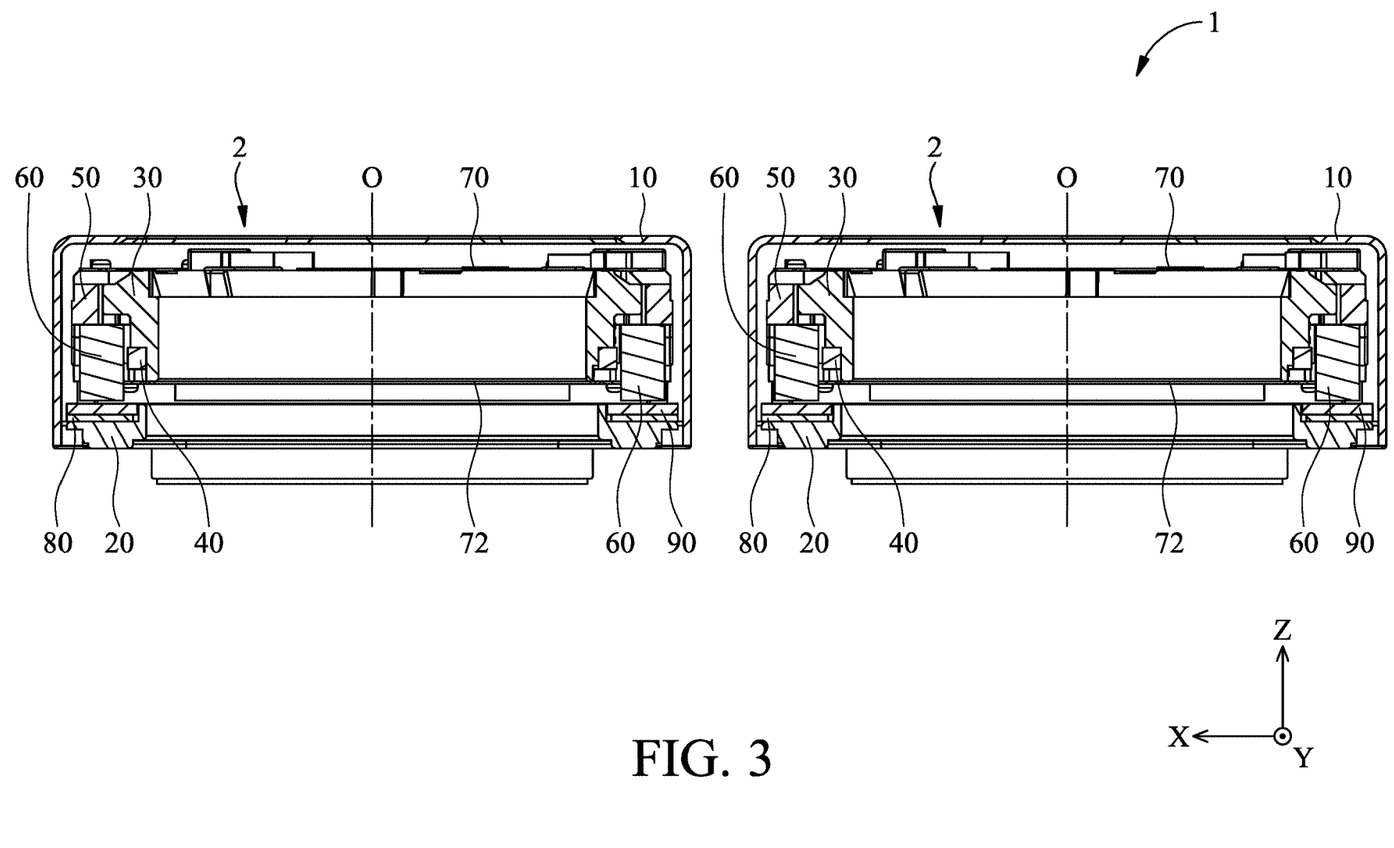
FIG. 3 is a cross-sectional view take along the line A-A' in FIG. 1.

Referring to FIGS. 1 to 4, wherein FIG. 1 is a schematic view of an electromagnetic driving system 1 in accordance with an embodiment of the invention, FIG. 2 is an exploded view of an electromagnetic driving module 2 in FIG. 1, and FIG. 3 is a cross-sectional view take along the line A-A' in FIG. 1. In this embodiment, two electromagnetic driving modules 2 of the electromagnetic driving system 1 may be provided in handheld digital products such as mobile phones or tablet PCs and arranged side-by-side in a long-axis direction (the X-axis direction). The two electromagnetic driving modules 2 are, for example, voice coil motors (VCM) having the same specification and equipped with an optical image stabilizer (OIS) function, but the invention is not limited thereto. In some embodiments, the two electromagnetic driving modules 2 of the electromagnetic driving system 1 may also have different specifications and be equipped with auto-focus (AF) and OIS functions.

As shown in FIGS. 1 to 3, each electromagnetic driving module 2 in this embodiment includes a top casing 10, a base 20, a holder 30, a coil 40, a frame 50, four magnets 60, an upper spring 70, a lower spring 72, four suspension wires 74, a circuit board 80, a driving board 90, and two magnetic field sensing elements 92.

The top casing 10 has a hollow structure. Also, the top casing 10 can be combined with the base 20 to form a housing F of the electromagnetic driving module 2, wherein the top casing 10 constitutes a top wall 10A and four sidewalls 10B of the housing F, and the base 20 constitutes a bottom wall 20A of the housing F. In addition, a top casing opening 12 and a base opening 22 are respectively formed on the top casing 10 and the base 20. The center of the top casing opening 12 is located on an optical axis O (parallel to the Z-axis) of a lens (not shown). The base opening 22 is also located on the optical axis O and faces an image sensor (not shown) placed outside the electromagnetic driving module 2. Accordingly, the lens in the electromagnetic driving module 2 and the image sensor can perform image focusing in the direction of the optical axis O.

The frame 50 (first member) has an opening 52 and four frame edges 50A respectively corresponding to the four sidewalls 10B of the housing F. In this embodiment, the four magnets 60 are affixed to the four frame edges 50A. In some embodiments, the four magnets 60 may also be affixed to four corners of the frame 50. The shape of the magnets 60 may be a long strip or a triangle.

The holder 30 (second member) has a annular structure and a through hole 32. The through hole 32 forms a threaded structure (not shown) corresponding to another threaded structure on the outer peripheral surface of the lens, such that the lens can be secured in the through hole 32. The coil 40 is wound around the outer peripheral surface of the holder 30.

In this embodiment, the holder 30 and the lens therein are movably disposed in the frame 50. More specifically, the holder 30 is suspended in the center of the frame 50 by the upper spring 70 and the lower spring 72 made of a metal material. When a current is supplied to the coil 40, the coil 40 can act with the magnetic field of the magnets 60 to generate an electromagnetic force to move the holder 30 and the lens therein along the Z axis with respect to the frame 50.

For example, the four magnets 60 may comprise at least one multipolar magnet which is used to electromagnetically act with the coil 40 to move the holder 30 and the lens along the optical axis O so as to perform image focusing.

Moreover, the outer peripheral portions of the upper and lower springs 70 and 72 are respectively connected to the upper and lower sides of the frame 50, and the inner peripheral portions of the upper and lower springs 70 and 72 are respectively connected to the upper and lower sides of the holder 30, so that the holder 30 can be suspended in the frame 50.

The circuit board 80, such as a flexible printed circuit board (FPC), is affixed to the base 20 by adhesion, for example. In this embodiment, the circuit board 80 is electrically connected to a driving unit (not shown) placed outside the electromagnetic driving module 2 to perform OIS and AF functions.

One end of the four suspension wires 74 is affixed to the circuit board 80 and the other end is connected to the upper spring 70, so that the suspension wires 74 can suspend the frame 50 and the holder 30 therein in the housing F. The suspension wires 74 may comprise a metal material.

The driving board 90 such as a printed circuit board, has four coils (not shown) therein. The positions of the four coils in the driving board 90 respectively correspond to the positions of the four magnets 60 (wherein the two coils are parallel to the X-axis direction and the other two coils are parallel to the Y-axis direction). The driving board 90 is affixed to the circuit board 80 by adhesion, for example.

It should be realized that the circuit board 80 is provided with wiring (not shown) for transmitting electrical signals to the coil 40 and the coils in the driving board 90. In some embodiments, the wiring on the circuit board 80 may be electrically connected to the coil 40 through the suspension wires 74 and the upper spring 70, thereby controlling the movement of the holder 30 along the optical axis O.

In this embodiment, two magnetic field sensing elements 92 are respectively mounted on two sides of the base 20 extending in the X-axis and Y-axis directions. The two magnetic field sensing elements 92 may be Hall effect sensors, MR sensors, or Fluxgate sensors, electrically connected to the circuit board 80 and can be used to learn the position offset amount of the frame 50 and the holder 30 with respect to the base 20 in the X-axis and Y-axis directions by detecting the magnetic field variation of the magnetic elements 60 on the frame 50.

Furthermore, the circuit board 80 can generate electrical signals to be transmitted to the coils in the driving board 90, and the coils in the driving board 90 can act with the magnets 60 on the frame 50 to generate an electromagnetic force to move the frame 50 and the holder 30 therein along a direction that is perpendicular to the optical axis O (parallel to the XY plane) to compensate for the position offset described above. As a result, the OIS function is achieved.

As shown in FIG. 3, since the position of the two electromagnetic driving modules 2 in the electromagnetic driving system 1 is very close, magnetic interference between adjacent magnets 60 in the two electromagnetic driving modules 2 is likely to occur, causing the focusing speed and positioning accuracy of the lenses to be adversely affected.

Figure 4:
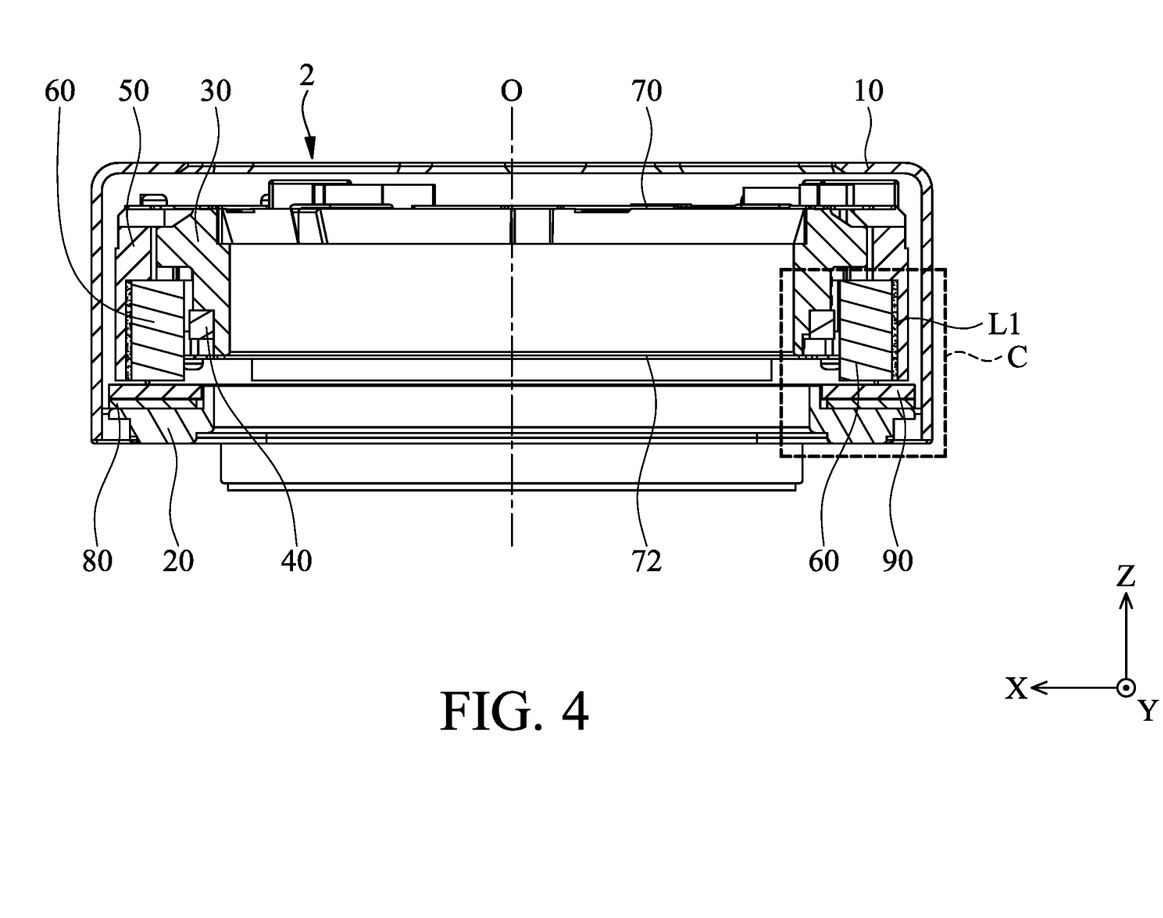
FIG. 4 is a cross-sectional view of an electromagnetic driving module, in accordance with another embodiment of the invention.
Figure 5:
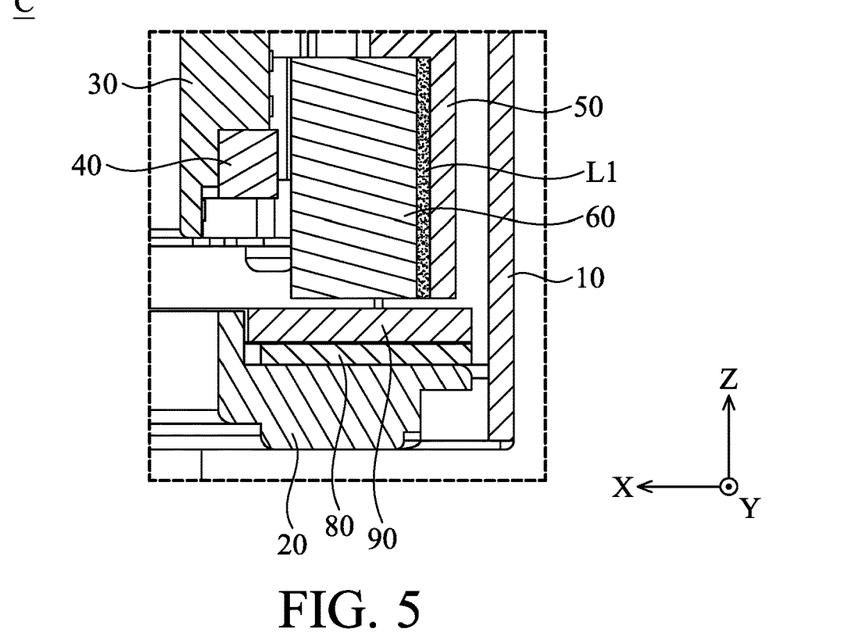
FIG. 5 is an enlarged view of the portion C in FIG. 4.

FIG. 4 shows an electromagnetic driving module 2 in accordance with another embodiment of the invention, wherein the electromagnetic driving module 2 can substitute for the left electromagnetic driving module 2 of FIG. 3, and FIG. 5 shows an enlarged view of the portion C in FIG. 4. The electromagnetic driving module 2 of FIG. 4 is different from the electromagnetic driving module 2 of FIG. 3 in that a film L1 is further disposed in the electromagnetic driving module 2. The film L1 may comprise ferromagnetic material with high magnetic permeability, which can be directly formed on an inner surface of the frame 50 by electroplating, evaporation coating, sputtering or molded interconnect device (MID) technology.

It should be noted that, as the film L1 is located between the frame 50 and the magnet 60, magnetic interference between the magnet 60 and a magnetic element outside the electromagnetic driving module 2 (such as the magnet 60 in another electromagnetic driving module 2) can be reduced. In an exemplary embodiment, the frame 50 may comprise metal or plastic material, and the film L1 may comprise Fe, Ni, Co or an alloy thereof.

In this embodiment, the magnetic permeability of the film L1 is higher than the magnetic permeability of the frame 50 (first member). As the frame 50 and the film L1 have different magnetic permeabilities and are arranged on the outer side of the magnet 60, the magnet 60 can be protected from being magnetically interfered with by a magnetic element outside the electromagnetic driving module 2 (such as the magnet disposed in the right electromagnetic driving module 2 of FIG. 3), so as to improve the focusing speed and positioning accuracy of the electromagnetic driving module.

Figure 6:
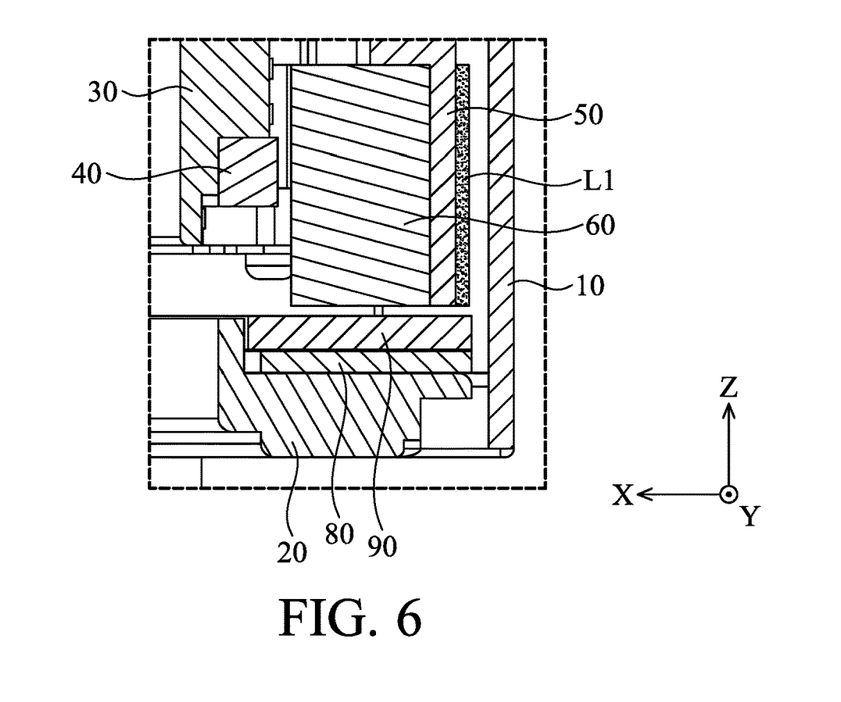
FIG. 6 is a partial enlarged cross-sectional view of an electromagnetic driving module, in accordance with another embodiment of the invention.

Referring to FIG. 6, the film L1 of another embodiment may be formed on an outer surface of the frame 50 by electroplating, evaporation coating, sputtering or molded interconnect device (MID) technology. As the frame 50 and the film L1 have different magnetic permeabilities and are arranged on the outer side of the magnet 60, the magnet 60 can be protected from being magnetically interfered with by the magnetic element outside the electromagnetic driving module 2.

Figure 7:
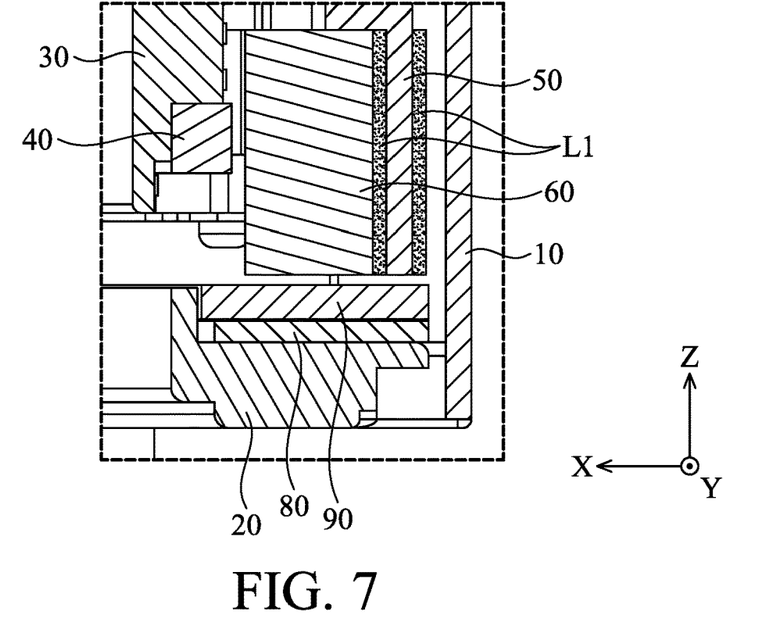
FIG. 7 is a partial enlarged cross-sectional view of an electromagnetic driving module, in accordance with another embodiment of the invention.

Referring to FIG. 7, in another embodiment of the electromagnetic driving module, two films L1 are respectively formed on the inner and outer surfaces of the frame 50. As the frame 50 and the films L1 have different magnetic permeabilities and are arranged on the outer side of the magnet 60 in a sandwiched manner, the magnet 60 can be protected from being magnetically interfered with by the magnetic element outside the electromagnetic driving module 2, so as to improve the focusing speed and positioning accuracy of the electromagnetic driving module.

Figure 8:
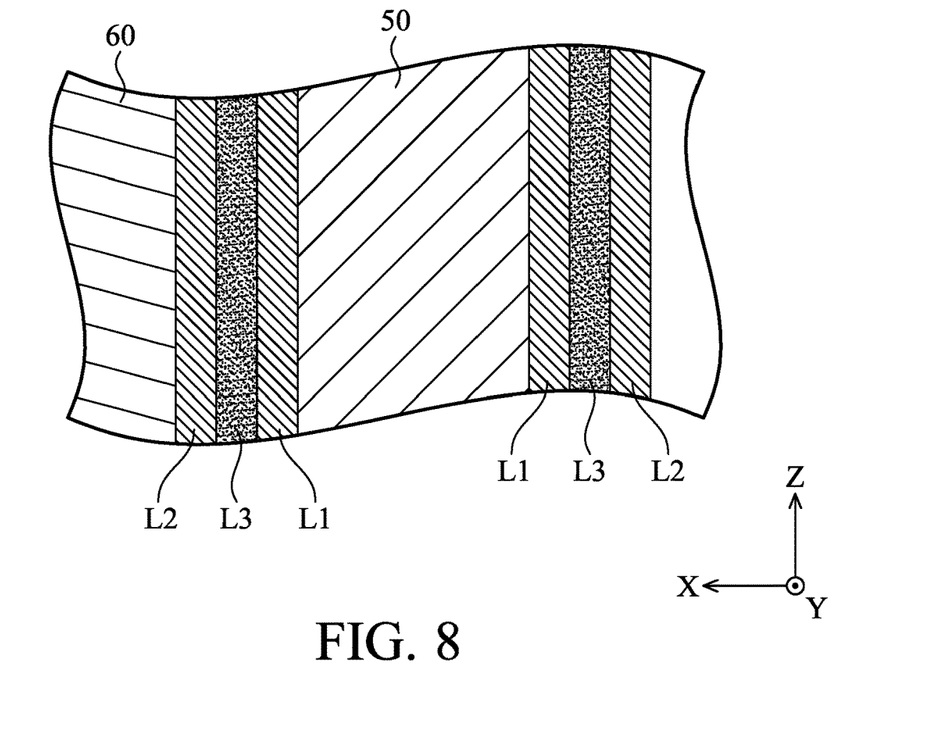
FIG. 8 is a partial enlarged cross-sectional view of an electromagnetic driving module, in accordance with another embodiment of the invention.

Referring to FIG. 8, in another embodiment, two multilayer electromagnetic insulating structures are respectively formed on the inner and outer surfaces of the frame 50. As shown in FIG. 8, besides the film L1, each of the multilayer electromagnetic insulating structures further comprises a film L2 and a middle layer L3 between the films L1 and L2, wherein the magnetic permeability of the films L1 and L2 is higher than the magnetic permeability of the middle layer L3. In an exemplary embodiment, the middle layer L3 may comprise polymer, ceramic, metal, or diamagnetic material, such as Au, Cu, Ag, Pb, Zn or an alloy thereof. The films L1 and L2 may comprise ferromagnetic material, and at least one of the middle layer L3 and the films L1 and L2 can be formed on the inner or outer surface of the frame 50 by electroplating, evaporation coating, sputtering or molded interconnect device (MID) technology.

In this embodiment, as the frame 50 and the two multilayer electromagnetic insulating structures (including the films L1, L2 and the middle layer L3) have different magnetic permeabilities and are arranged on the outer side of the magnet 60 in a sandwiched manner, surface effect between the films L1, L2 and the middle layer L3 in the multilayer structure can be generated to enhance electromagnetic insulation of the electromagnetic driving module without increasing the thickness thereof. That is, the magnet 60 can be protected from being magnetically interfered with by the magnetic element outside the electromagnetic driving module 2, so that the focusing speed and positioning accuracy of the electromagnetic driving module would not be unduly influenced by the magnetic interference.

Figure 9:
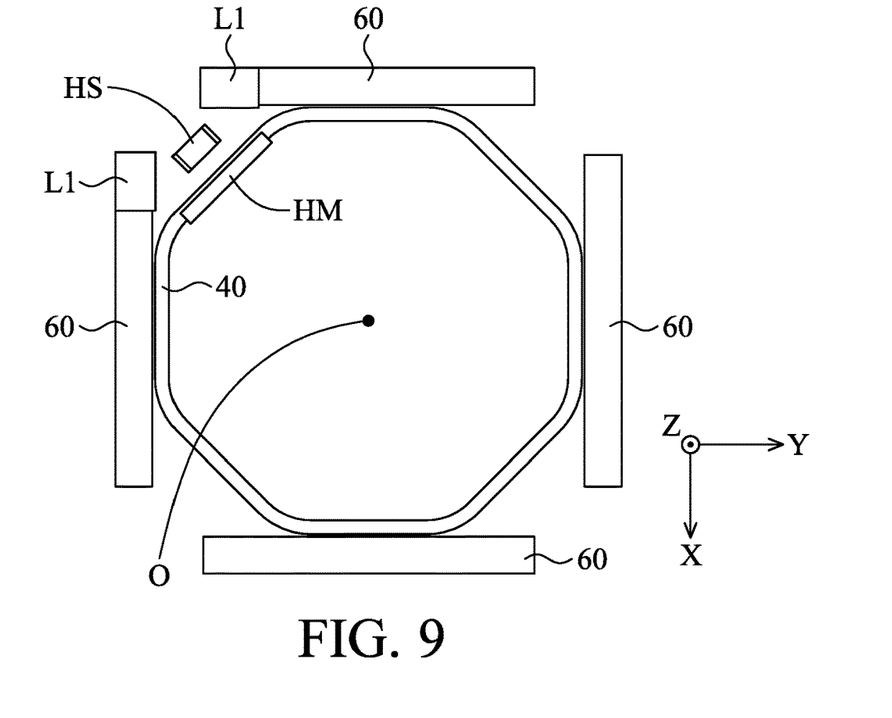
FIGS. 9 and 10 are schematic views show the relative position of the coil, the magnets, the films, the magnetic field sensing elements, and the magnetic element in an electromagnetic driving module, in accordance with an embodiment of the invention.
Figure 10:
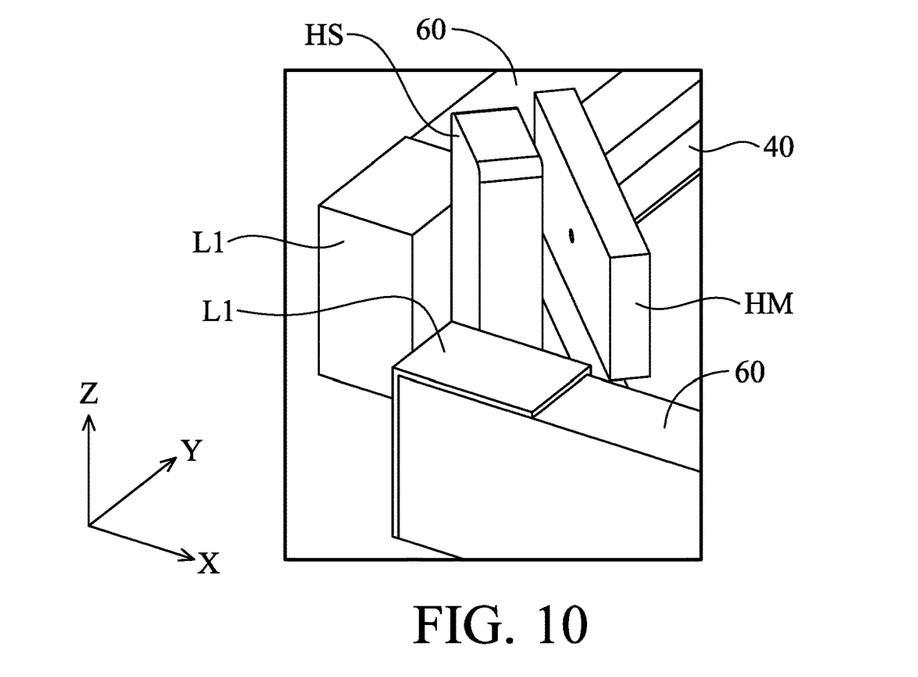

Referring to FIGS. 9 and 10, the electromagnetic driving module 2 in another embodiment may further comprise a magnetic field sensing element HS and a magnetic element HM (such as permanent magnet). The magnetic field sensing element HS and the magnet 60 are affixed to the frame 50 (first member), and the magnetic element HM and the coil 40 are affixed to the holder 30 (second member). It should be noted that the magnetic field sensing element HS is used to detect the displacement of the magnetic element HM, so that position offset amount of the holder 30 relative to the frame 50 along the optical axis O can be obtained.

In this embodiment, for simplification and easy understanding, only the relative positions of the coils 40, the magnets 60, the films L1, the magnetic field sensing element HS, and the magnetic element HM are depicted in FIGS. 9 and 10. In practice, the magnetic field sensing element HS may be disposed on the holder 30, and correspondingly, the magnetic element HM may be disposed on the frame 50, so as to detect the relative displacement between the holder 30 and the frame 50 along the optical axis O.

When viewed along the Z axis (the optical axis O), as clearly shown in FIGS. 9 and 10, the magnetic field sensing element HS and the magnetic element HM are located at a corner of the coil 40 and between two adjacent magnets 60. Additionally, two films L1 are respectively formed on the two adjacent magnets 60 to insulate against magnetic interference between the magnets 60 and the magnetic element HM. In an exemplary embodiment, the magnetic permeability of the films L1 is different from the magnetic permeability of magnets 60, and the films L1 can be directly formed on the magnets 60 by electroplating, evaporation coating, sputtering or molded interconnect device (MID) technology.

It should be noted that each of the magnets 60 may have a cuboid structure, wherein the films L1 are respectively disposed at an end of the magnets 60 and extended on at least two adjacent surfaces of the cuboid structures. As shown in FIG. 10, the film L1 may cover an end surface of the magnet 60 to efficiently insulate against magnetic interference between the magnets 60 and the magnetic element HM.

Figure 11:
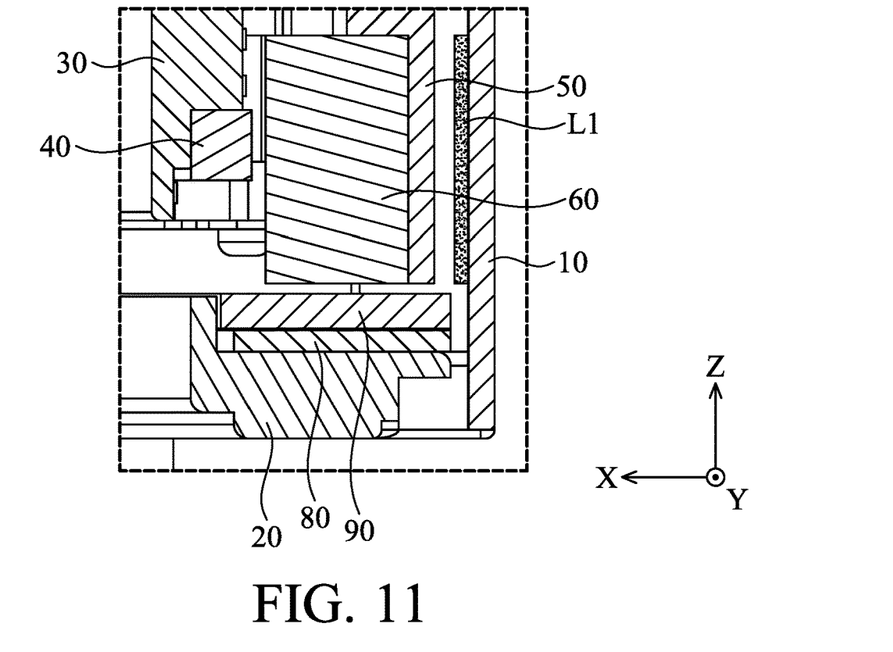
FIG. 11 is a partial enlarged cross-sectional view of an electromagnetic driving module, in accordance with another embodiment of the invention.
Figure 12:
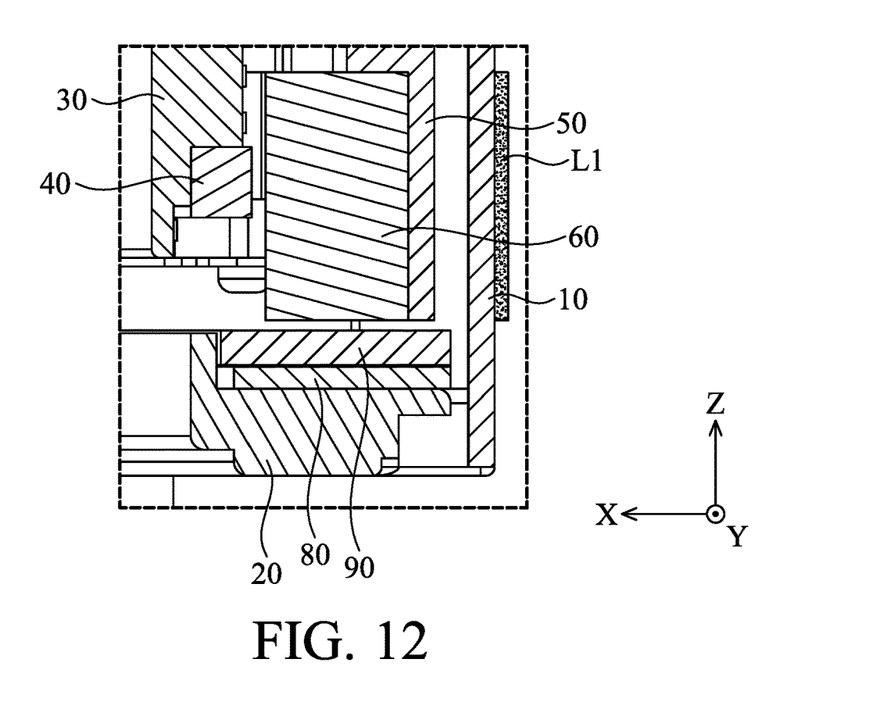
FIG. 12 is a partial enlarged cross-sectional view of an electromagnetic driving module, in accordance with another embodiment of the invention.

Referring to FIGS. 11 and 12, the film L1 may also be directly formed on the inner or outer surface of the top casing 10, and the position of the film L1 corresponds to the magnet 60 in the top casing 10. Thus, the magnet 60 can be protected from being magnetically interfered with by the magnetic element outside the electromagnetic driving module 2. In an exemplary embodiment, the top casing may comprise metal or plastic material, and the magnetic permeability of the film L1 is different from the magnetic permeability of the top casing 10, wherein the film L1 can be directly formed on the top casing 10 by electroplating, evaporation coating, sputtering or molded interconnect device (MID) technology.

In summary, at least one film is provided in the electromagnetic driving module according to the aforementioned embodiments, wherein the film may comprise ferromagnetic material with high magnetic permeability and can be directly formed on the magnet, the frame or the top casing by electroplating, evaporation coating, sputtering or molded interconnect device (MID) technology. Thus, the magnet "inside" the electromagnetic driving module can be protected from being magnetically interfered with by the magnetic element "outside" the electromagnetic driving module (such as the magnet 60 disposed in a movable mechanism of the right electromagnetic driving module 2 in FIG. 3). Additionally, the film may also be used to protect the magnet "inside" the electromagnetic driving module from being magnetically interfered with by another magnetic element which is also "inside" the electromagnetic driving module (such as the magnetic element HM in FIGS. 9 and 10), so as to improve the focusing speed and positioning accuracy of the electromagnetic driving module.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electromagnetic driving module, comprising:
   a first member;
   a second member, movably connected to the first member;
   an electromagnetic driving assembly, comprising a magnet and a coil respectively disposed on the first member and the second member, to move the second member relative to the first member;
   two films, formed on the same side of the first member to reduce magnetic interference between the magnet and a magnetic element, wherein the magnetic permeability of the films is higher than the magnetic permeability of the first member; and
   a middle layer, formed between the films, wherein the magnetic permeability of the films is higher than the magnetic permeability of the middle layer.

2. The electromagnetic driving module as claimed in claim 1, wherein the middle layer comprises polymer, ceramic or metal material.

3. The electromagnetic driving module as claimed in claim 1, wherein the middle layer comprises diamagnetic material.

4. The electromagnetic driving module as claimed in claim 1, wherein the middle layer comprises Au, Cu, Ag, Pb, Zn or an alloy thereof.

5. The electromagnetic driving module as claimed in claim 1, wherein the films comprise ferromagnetic material.

6. The electromagnetic driving module as claimed in claim 1, wherein the films comprise Fe, Ni, Co or an alloy thereof.

7. The electromagnetic driving module as claimed in claim 1, wherein the films are formed on the first member by electroplating, evaporation coating, sputtering or molded interconnect device (MID) technology.

8. The electromagnetic driving module as claimed in claim 1, wherein the films are formed on the first member and located between the first member and the magnet.

9. The electromagnetic driving module as claimed in claim 1, further comprising a housing with the first member, the second member, and the electromagnetic driving assembly received therein, wherein the films are formed on the first member and located between the first member and the housing.

10. An electromagnetic driving module, comprising:
    a first member;
    a second member, movably connected to the first member;
    an electromagnetic driving assembly, comprising a magnet and a coil respectively disposed on the first member and the second member, to move the second member relative to the first member;
    a housing, wherein the first member, the second member, and the electromagnetic driving assembly are disposed in the housing; and
    a film, formed on the housing to reduce magnetic interference between the magnet and a magnetic element outside the electromagnetic driving module, wherein the housing is located between the film and the magnet, and the magnetic permeability of the film is different from the magnetic permeability of the housing.

11. The electromagnetic driving module as claimed in claim 10, wherein the housing comprises metal or plastic material.

12. The electromagnetic driving module as claimed in claim 10, wherein the film is formed on the housing by electroplating, evaporation coating, sputtering or molded interconnect device (MID) technology.

* * * * *